United States Patent [19]

Ramunas

[11] Patent Number: 5,613,693
[45] Date of Patent: Mar. 25, 1997

[54] TOOLHOLDER ASSEMBLY FOR ACCURATELY SECURING A TOOL SHANK IN A SOCKET

[75] Inventor: Valdas S. Ramunas, Euclid, Ohio

[73] Assignee: Kennametal Inc., Latrobe, Pa.

[21] Appl. No.: 522,783

[22] Filed: Sep. 1, 1995

[51] Int. Cl.⁶ .................................................. B23B 31/107
[52] U.S. Cl. .......................... 279/76; 279/83; 83/698.91; 285/404; 403/362
[58] Field of Search ........................ 279/76, 83; 285/404; 403/362; 72/481.3, 481.6–481.9; 83/698.91

[56] References Cited

U.S. PATENT DOCUMENTS

| | | | |
|---|---|---|---|
| 2,221,371 | 11/1940 | De Bethune | 279/76 |
| 2,938,698 | 5/1960 | Johnson | 248/314 |
| 3,588,135 | 6/1971 | Porter | 279/83 |
| 3,762,731 | 10/1973 | Matsumoto | 279/51 |
| 4,096,776 | 6/1978 | Laucke | 83/698 |
| 4,958,966 | 9/1990 | Andrews | 408/239 |

Primary Examiner—Steven C. Bishop
Attorney, Agent, or Firm—James G. Porcelli

[57] ABSTRACT

A toolholder assembly for accurately securing a shank of a tool in a socket along a desired alignment is provided. The toolholder assembly includes an inner collar having an annular wall whose inner surface defines the socket recess, and whose outer surface defines a collar periphery, an outer clamping assembly surrounding the periphery of the inner collar that includes a set screw for applying a compressive force to a portion of the periphery of the inner collar, and a pin-like tool retainer that freely extends through a radially-disposed opening in the inner collar wall. The tool retainer is disposed opposite from the set screw of the outer clamping assembly, and directs the compressive force applied by the set screw across the socket recess to retain a tool shank therein while diverting the compressive force away from the opposing portion of the inner collar wall to prevent hoop distortion from occurring therein. The toolholder assembly is particularly useful in accurately securing and aligning a punch in a compacting press of the type used to manufacture cutting inserts.

21 Claims, 3 Drawing Sheets

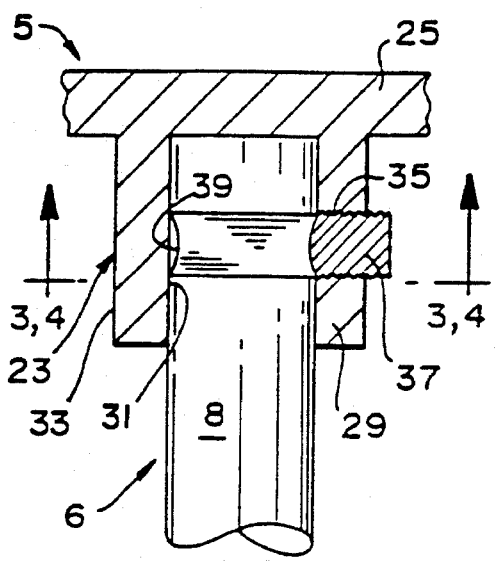
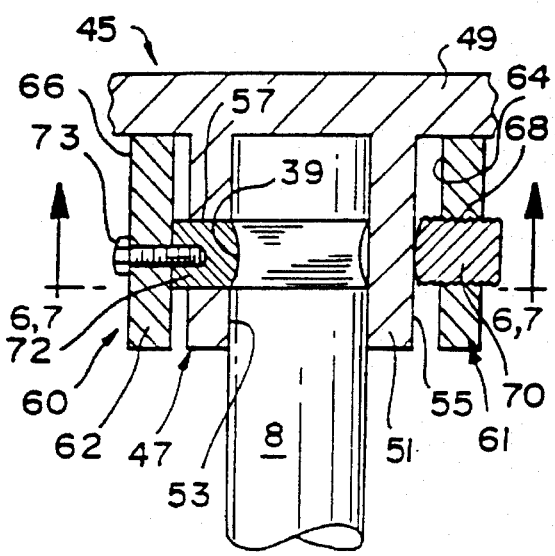
FIG. 2 (PRIOR ART)
FIG. 5
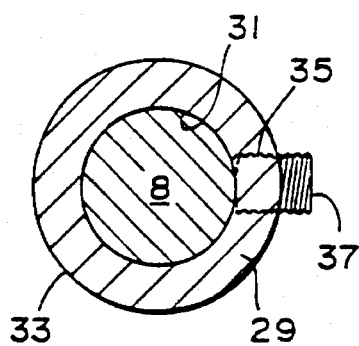
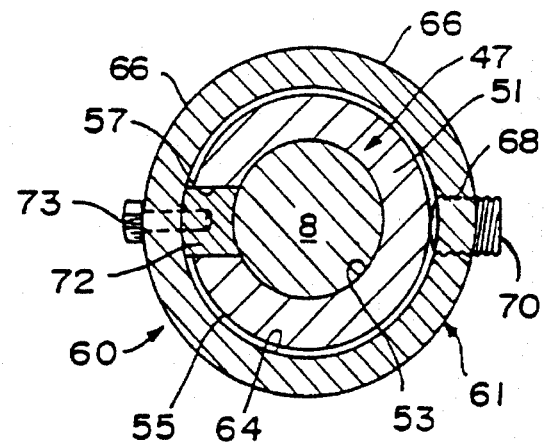
FIG. 3 (PRIOR ART)
FIG. 6
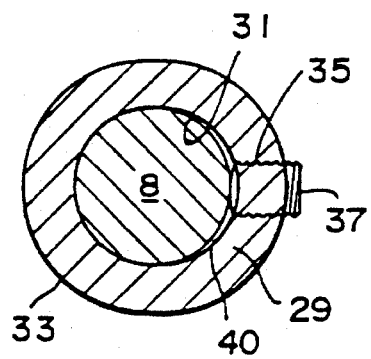
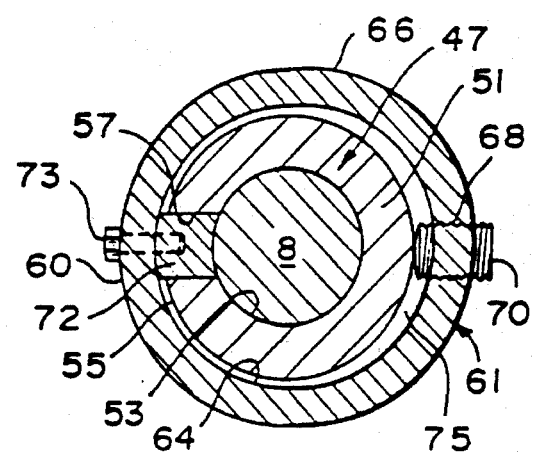
FIG. 4 (PRIOR ART)
FIG. 7

TOOLHOLDER ASSEMBLY FOR ACCURATELY SECURING A TOOL SHANK IN A SOCKET

BACKGROUND OF THE INVENTION

This invention generally relates to toolholders, and is particularly concerned with a toolholder assembly for accurately securing the shank of a punch in a compacting press of the type used to make cutting inserts.

Toolholders of the type utilizing set screws are well known in the prior art. Such toolholders generally comprise a collar having an annular wall. The inner surface of the annular wall defines a socket for receiving the end of a tool shank, while the outer surface of the wall defines the periphery of the collar. A set screw radially-oriented in the annular wall of the collar has a distal end that is extendible into and retractable from the socket recess. To secure a tool in the toolholder, one merely turns the set screw after the end of the tool shank has been inserted into the socket recess so that the tool shank is clampingly engaged between the end of the set screw and the opposing wall of the recess.

While set screw-type toolholders provide a simple and inexpensive mechanism for positively securing the end of a tool shank, the inventor has observed that such a mechanism is limited in the degree to which it can maintain an accurate alignment of the tool shank in the socket recess. Accurate alignment is necessary in many toolholder applications. One specific application involves the set screw type toolholder used to secure punches in compacting presses. These compacting presses may be used to manufacture cutting inserts. An example of such a compacting press 1 is illustrated in FIG. 1. Such presses include an upper plate assembly 3 having a set screw-type collar 5 for holding an upper punch 6. The punch 6 includes an upper ram 7 on the end of a shank 8 which may be cylindrical. The upper plate assembly 3 is reciprocally mounted with respect to a die table 13 by means of two guide rods 9a–b. The rods 9a–b are secured onto the sides of the upper plate assembly 3 by means of mounting screws 10a–b. Bottom portions of the guide rods are slidably mounted in cylindrical bushings 11a–b present in the sides of the die table 13. A forming cavity 15 is centrally disposed in the die table 13 just under the ram 7 of the upper punch 6. A stationary lower punch 17 with a lower ram 18 is located along the center line of the forming cavity 15, and extends no higher than the level of the die table 13. The lower punch 17 includes a lower ram 18 on the end of the punch. An annular die 19 circumscribes the forming cavity 15.

During the operation of the compacting press, carbide powder is loaded into the forming cavity 15, and the upper punch is forcefully pressed downwardly via a suitable hydraulic linkage (not shown) so that the carbide powder is compressed between the face of the upper ram 7, the lower ram 18 and the inner walls of the die 19. To insure the formation of a proper "green" insert (which is later further hardened by sintering), the dimensional tolerances between the outer diameter of the upper ram 7 and the inner diameter of the die 19 must be precise. Hence it is essential that the collar 5 maintain an accurate, center line alignment between the upper punch 6 and the forming cavity 15 defined by the die 19. In the past, set screw type collars have been used for this purpose. However, the applicant has observed that the deformation the set screw of the toolholder 5 causes to the collar can interfere with the accurate alignment between the upper punch and the forming cavity.

With specific reference now to FIGS. 2 and 3, such prior art toolholders 5 include a collar 23 circumscribed at its upper portion by an annular flange 25. Flange 25 facilitates the mounting of the toolholder 5 to the upper plate assembly 3 by means of bolts 27a,b (shown in FIG. 1). The collar 23 is formed in large part by an annular wall 29 whose inner surface defines a socket recess 31 for receiving the shank 8 of the upper punch 6, and an outer surface that defines the periphery 33 of the collar 23. The annular wall 29 has a radially-oriented threaded bore 35 for receiving a set screw 37. The distal end of the set screw 37 is received in an annular whistle notch 39 that circumscribes the proximal end of the punch shank 8. To minimize unwanted movement of the shank 8, the inner diameter of the socket recess 31 and the outer diameter of the shank 8 are dimensioned to very near the same size.

When the shank 8 is inserted into the recess 31 with the set screw 37 in a loosened condition, the shank 8 seats concentrically within the recess 31 as shown in FIG. 3. However, when the set screw 37 is tightened to insure that the shank 8 will not fall from the recess 31, the screw 37 applies a radial force to the annular wall 29 of the collar 23 which in turn results in an unwanted, lenticularly-shaped gap 40 as shown in FIG. 4. The gap 40 allows the shank 8 to rock about the set screw, thereby compromising the desired precise alignment between the axes of the cylindrical shank 8, and the annularly-shaped recess 31. This misalignment not only results in the manufacture of cutting inserts that are not within tolerances (which in turn necessitates a further grinding step or a complete discarding of the insert); it further can cause chipping of the edges of the upper and lower rams 7 and 18 and of the die 19, which in turn necessitates their replacement.

Clearly, there is a need for a toolholder capable of accurately mounting a punch or other tool in a desired alignment. While chuck and collet type toolholders are known which are capable of accurately aligning cutting tools, such toolholders require the precise machining of a relatively large number of parts and surfaces before such accurate alignment characteristics can be achieved. Accordingly, it would be desirable if such a toolholder were capable of achieving the same accurate tool alignment as collet and chuck-like toolholders by means of a mechanism that was far simpler in structure, and hence much easier and less expensive to manufacture.

SUMMARY OF THE INVENTION

Generally speaking, the invention is a toolholder assembly for accurately securing the shank of a tool in a socket along a desired alignment that overcomes the aforementioned shortcomings associated with the prior art by means of a relatively simple mechanism. To this end, the toolholder assembly comprises an inner collar having an annular wall that defines a socket recess on its inner surface, and a collar periphery on its outer surface, an outer clamping assembly that surrounds the periphery of the inner collar that includes a means, such as a set screw, for applying a compressive force around at least a portion of the inner collar periphery, and a tool retainer extending through the inner collar wall opposite from the set screw, and in contact with the outer clamping assembly. The tool retainer advantageously directs the compressive force generated by the set screw across the socket recess to retain a tool shank therein while diverting the compressive force away from the opposite portion of the inner collar wall to prevent hoop distortion from occurring therein.

In the preferred embodiment, the tool retainer is a stabilizing element that extends through a radially-oriented opening in the inner collar wall that is 180° apart from the portion of the inner collar wall that the set screw of the outer clamping assembly engages. The outer end of the tool retainer is integrally connected to the outer clamping assembly, while the inner end clampingly engages the end of the shank of a tool inserted into the socket recess. When the set screw applies a radially-directed compressive force against the outer surface of the inner collar wall, this force is effectively neutralized by the equal and opposite force applied to the inner surface of the inner collar wall by the action of the tool retainer compressively engaging the tool shank in the socket recess. Thus, while compressive forces are present across a portion of the inner collar wall, and while the set screw may cause some hoop distortions in the walls of the outer clamping assembly, annular distortions in the walls of the inner collar are completely avoided.

To enhance the alignment ability and overall stability of the toolholder assembly of the invention, the socket recess is preferably complementary in shape to the end of the shank of the tool being held. Additionally, the end of the tool retainer is in alignment with the end of the opposing set screw to eliminate moment forces that could cause unwanted rocking movement of the tool shank.

While the invention provides a toolholder assembly that is generally applicable to any situation requiring the secure and accurate alignment of a tool in a socket, it is particularly useful for holding a punch in a compacting press of the type used to manufacture cutting inserts. In such an application, the resulting accurate alignment of the punch can result in the manufacture of "green" inserts which may be so accurately dimensioned to minimize or eliminate machining to bring them within manufacturing tolerances.

BRIEF DESCRIPTION OF THE SEVERAL FIGURES

FIG. 2 is a side, cross-sectional view of the prior art, set screw-type toolholder used in the compacting press illustrated in FIG. 1;

FIG. 3 is a cross-sectional view of the toolholder illustrated in FIG. 2 along the line 3—3, with the set screw in a loosened condition;

FIG. 4 is a cross-sectional view of the prior art toolholder illustrated in FIG. 2 along the line 4—4, with the set screw in a tightened condition illustrating the distortion of the collar caused by the radial set screw;

FIG. 5 is a side, cross-sectional view of a first embodiment of the toolholder of the invention;

FIG. 6 is a cross-sectional view of the toolholder illustrated in FIG. 5 along the line 6—6, with the set screw in a loosened condition;

FIG. 7 is a cross-sectional view of the toolholder of FIG. 5 along the line 7—7, with the set screw in a tightened condition, illustrating how the outer collar that forms the outer clamping assembly that may become distorted from the force of the set screw while the inner collar remains undistorted;

DETAILED DESCRIPTION OF THE PREFERRED EMBODIMENT

Figure 1:
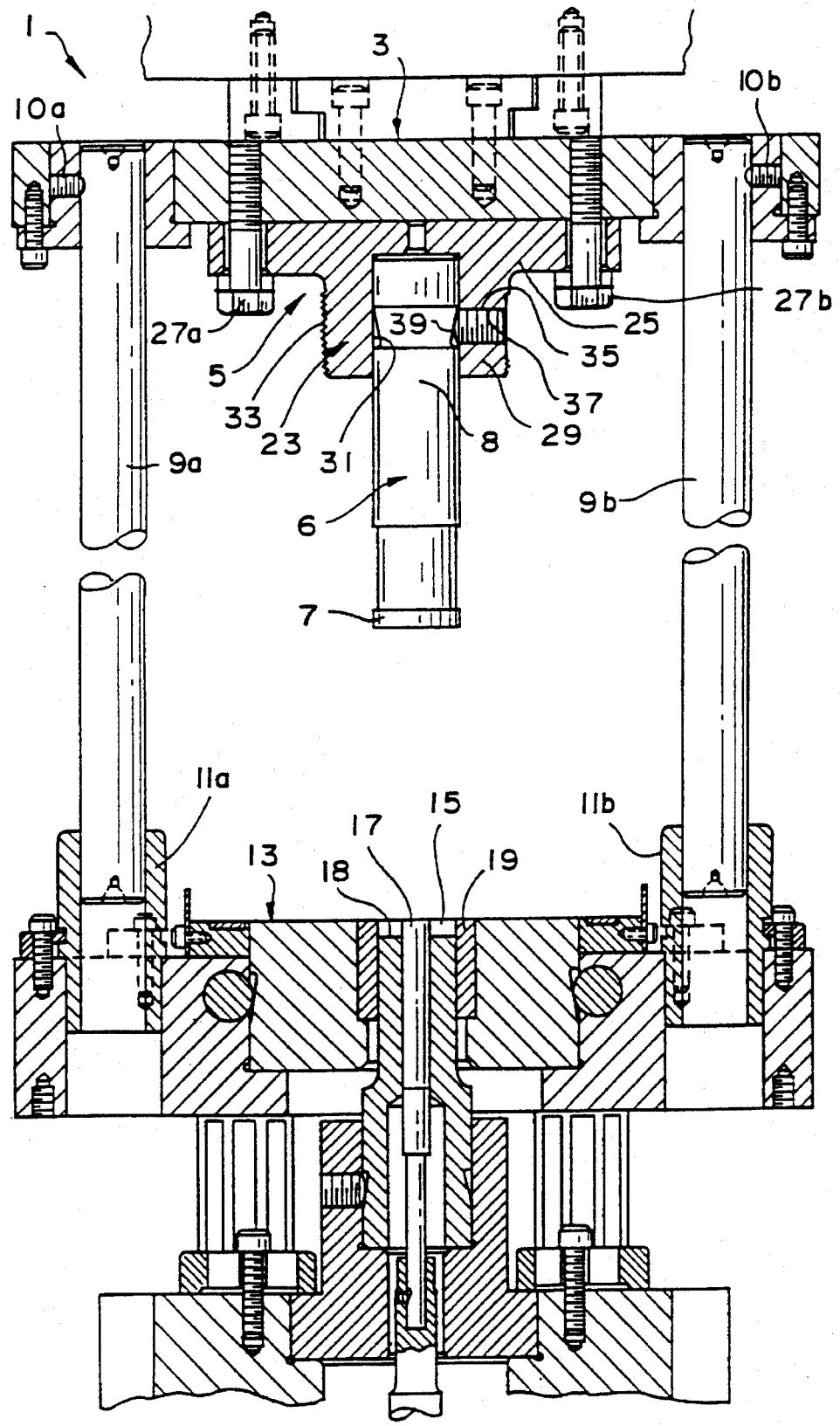
FIG. 1 is a side, cross-sectional view of a compacting press of the type used to manufacture cutting inserts, illustrating in cross-section a prior art set screw-type toolholder used to secure and align the upper compacting ram.

With reference now to FIGS. 5 and 6, the toolholder 45 of the invention includes an inner collar 47 having an annular flange 49 at its bottom portion for facilitating mounting. The inner collar 47 is substantially formed from an annular wall 51 whose inner surface defines a socket recess 53, and whose outer surface defines a periphery 55. The wall 51 includes a radially-oriented through bore 57 which registers with the tool shank 8 when the shank 8 is inserted into the socket recess 53 as shown. The tool shank 8 may have a whistle notch 39.

An outer clamping assembly 60 surrounds the periphery 55 of the inner collar 47. In this embodiment of the invention, the clamping assembly 60 is formed from an outer collar 61 which, like inner collar 47, is substantially formed from an annular wall 62. The inner surface 64 of the annular wall 62 closely circumscribes the periphery 55 of the inner collar 47. The annular wall 62 of the outer collar 61 includes, on one side, a radially-oriented, threaded bore 68 that engages a set screw 70, while the other side includes a tool retainer 72 that freely extends through the radially-oriented through bore 57 of the inner collar 47. Preferably, the length of the tool retainer 72 along the longitudinal axis of the shank 8 is great enough to span the length of the notch 39 thereby providing support at both sides of the notch 39. A mounting screw 73 secures the tool retainer 72 into position up to 180° away from the threaded bore 68 and set screw 70. The distal end of the tool retainer 72 is complementary in shape to the tool shank 8, or in the alternative, is complementary in shape to the whistle notch 39 on the tool shank 8.

The operation of the toolholder 45 of the invention is illustrated in FIGS. 6 and 7. When the set screw 70 is an untightened state, the tool shank 8 remains in concentric alignment with both the inner collar 47 and the outer collar 61 as illustrated in FIG. 6. When the set screw 70 is tightened, as is illustrated in FIG. 7, the shank 8 of the tool disposed within the socket recess 53 is securely gripped between the tool retainer 72 on one side, and the opposing portion of the annular wall 51 adjacent to the set screw 70. While the tightening of the set screw 70 creates a force in the outer collar 61 that results in a lenticular gap 75 between the inner and outer collars 47,61, no such gap is generated between the tool shank 8 and the socket recess 53 of the inner collar 47. Hence, accurate concentric alignment is maintained between the tool shank 8 and the inner collar 47 as a result of the tool retainer 72 applying an equal and opposite clamping counter force to the set screw 70.

Figure 8A:
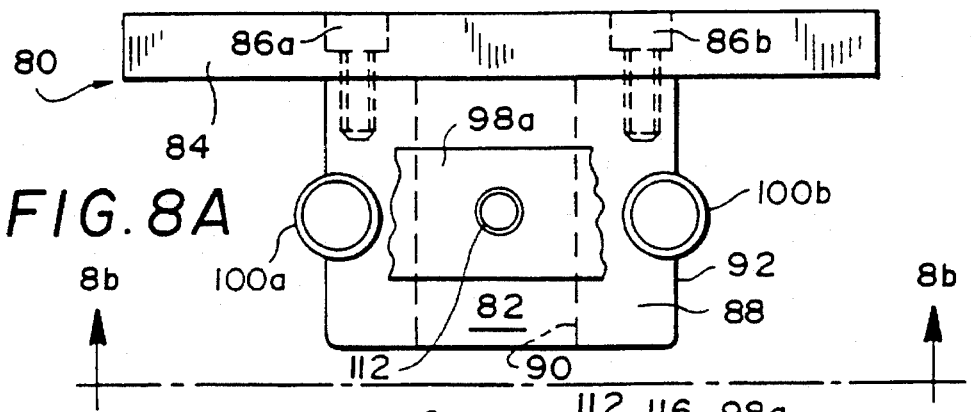
FIG. 8A is side view of a second embodiment of the toolholder of the invention, with part of the outer clamping assembly broken away for clarity.
Figure 8B:
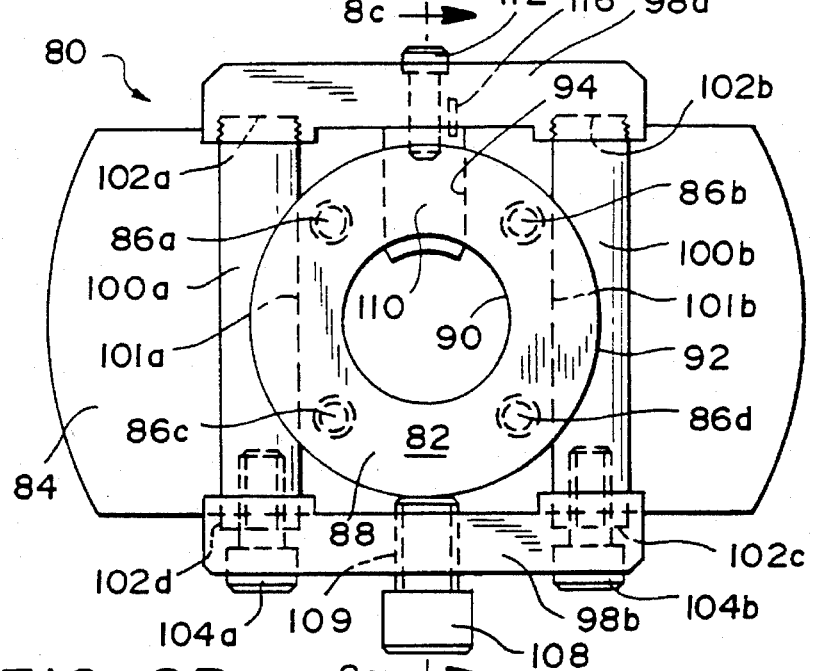
FIG. 8B is a bottom view of the toolholder illustrated in FIG. 8A along the line 8B—8B.
Figure 8C:
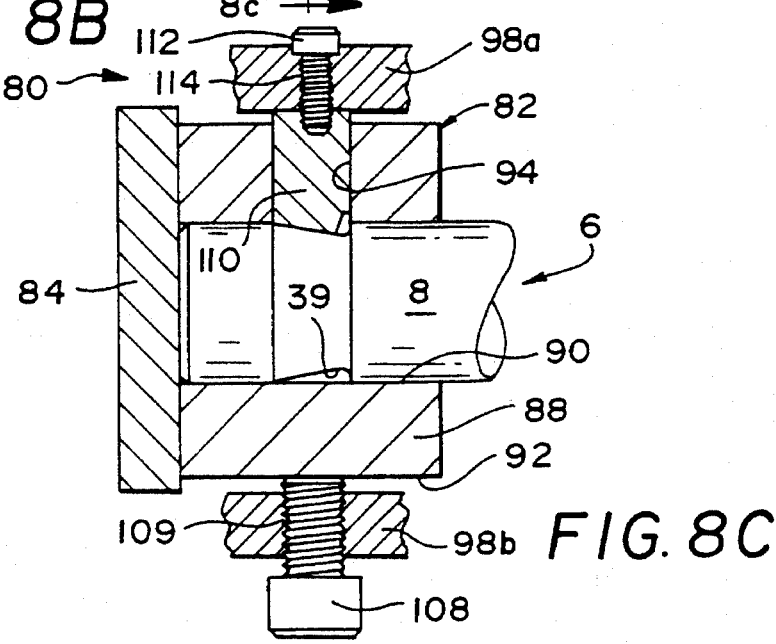
FIG. 8C is a side, cross-sectional view of the toolholder illustrated in FIG. 8B along the line 8C—8C.

A second embodiment of the toolholder 80 of the invention is illustrated in FIGS. 8A, 8B, and 8C. This embodiment of the invention likewise includes an inner collar 82. However, instead of having an integrally-formed annular flange, a separate flange plate 84 is secured to the upper end of the inner collar 82 by means of four mounting screws 86a–d. As was the case with the first embodiment, the inner collar 82 is substantially formed from an annular wall 88 whose inner surface defines the socket recess 90, and whose outer surface defines a periphery 92. Additionally, the annular wall 88 includes a radially-oriented through bore 94 through which a tool retainer 110 freely extends.

However, in lieu of an outer collar 61, the outer clamping assembly 60 of the second embodiment 80 is formed from a pair of opposing outer clamping members 98a,b secured together by a pair of inner clamping members 100a,b. The inner clamping members 100a,b partially extend through opposing walls in the inner collar 82 by way of complementarily shaped grooves 101a,b. Outer clamping member 98a includes a pair of threaded recesses 102a,b for receiving threaded ends of the inner clamping members 100a,b, while the other outer clamping member 98b includes smooth recesses 102c,d for receiving the cylindrical ends of the inner clamping members 100a,b. Securing bolts 104a,b link the outer and inner clamping members 98a,b and 100a,b into a roughly square-shaped clamping frame best seen in FIG. 8B. Outer clamping member 98b includes a set screw 108 that extends through a centrally disposed threaded bore 109 as shown. Outer clamping member 98a includes the previously mentioned tool retainer 110, which is secured thereto by means of a mounting screw 112 engaged to a threaded bore 114 in the retainer 110. A roll pin 116 is provided to prevent the tool retainer 110 from rotating when mounting screw 112 is tightened. As is best seen in FIG. 8C, the distal end of the tool retainer 110 is substantially complementary in shape to the tool shank 8, or in the alternative is complementary in shape to the whistle notch 39 on the tool shank 8.

The operation of the toolholder 80 of the second embodiment is substantially the same as the previously described operation of the first embodiment toolholder 45. When the set screw 108 is tightened after the end of the tool shank 8 is inserted into the socket recess 90, radial forces generated by the set screw 108 are borne by the outer clamping assembly 60, and not by the inner collar 82 as a result of the tool retainer 110 applying an equal and opposite clamping force to the set screw 108. Hence, while the section of the annular wall 88 of the inner collar 82 disposed between the set screw 108 and a tool shank 8 will experience compressive forces as the set screw 108 is tightened, it will not experience any type of annularly distortive hoop stresses since such stresses are diverted away from the inner collar 82 by the tool retainer 110 which freely extends through the annular wall 88 via through bore 94.

While the outer clamping assembly 60 has been disclosed in the form of an outer collar 61 or as a frame formed from outer and inner clamping members 98a,b, 100a,b, it could also be formed from a pair of "C" shaped, semicircular components clampingly held around the inner collar 47 by bolts. Additionally, the tool retainer 72 may take the form of a stabilizing element slidably and reciprocally mounted in an opening in the annular wall 51 of the inner collar 74, abutting against but not connected to the outer clamping assembly 60. All such variations, modifications, and additions are encompassed within the scope of this invention, which is limited only by the claims appended hereto.

What is claimed is:

1. A toolholder assembly for accurately securing a shank of a tool in a socket in a desired alignment, comprising:

an inner collar having a wall with an inner surface that defines a socket recess for receiving a shank of a tool, and an outer surface that defines a collar periphery;

an outer clamping assembly surrounding the periphery of said inner collar including means for applying a compressive force around a portion of said periphery, and a tool retainer extending through a portion of said inner collar wall opposite from said compressive force applying means for directing said compressive force across said socket recess to retain a tool shank therein while diverting said compressive force away from said opposite portion of said inner collar wall to prevent hoop distortion in said inner collar wall.

2. The toolholder assembly of claim 1, wherein said tool retainer includes a first end for clampingly engaging a tool shank in said socket recess and a second end that contacts said outer clamping assembly.

3. The toolholder assembly of claim 2, wherein said second end of said tool retainer is mounted on said outer clamping assembly.

4. The toolholder assembly of claim 1, wherein said tool retainer freely extends through a bore in said portion of said inner collar wall.

5. The toolholder assembly of claim 1, wherein said compressive force applying means includes a set screw threadedly engaged in a portion of said outer clamping assembly and having an end that applies a compressive force on one side of said inner collar wall while pulling an opposite portion of said outer clamping assembly into compressive engagement around an opposite side of said inner collar wall.

6. The toolholder assembly of claim 1, wherein said inner collar is annular, and said tool retainer is freely movable through a portion of said inner collar wall along a radius of said inner collar.

7. The toolholder assembly of claim 1, wherein said socket recess is complementary in shape to said shank of said tool.

8. The toolholder assembly of claim 6, wherein said outer clamping assembly includes an annular outer collar having an inner surface that closely circumscribes the outer periphery of the inner collar.

9. The toolholder assembly of claim 1, wherein the tool retainer is aligned with said compressive force applying means to avoid the generation of moment forces in said shank.

10. The toolholder assembly of claim 5, wherein said tool retainer applies an equal and opposite compressive force to the portion of the inner collar wall engaged by said set screw through a shank of a tool inserted into said socket recess.

11. A toolholder assembly for accurately securing a shank of a tool in a socket along a desired alignment with respect to said socket, comprising:

an inner collar having an annular wall with an inner surface that defines a socket recess for receiving an end of a tool shank, and an outer surface that defines a collar periphery;

an outer collar closely circumscribing the periphery of said inner collar including a set screw for applying compressive force on one portion of said inner collar wall while pulling a portion of said outer collar compressively around an opposing portion of said inner collar wall, and a tool retainer freely extending through said opposing portion of said inner collar wall for directing said compressive force across said socket recess to retain an end of a tool shank therein while diverting said compressive force away from said opposing portion of said inner collar wall to prevent hoop distortion in said inner collar wall.

12. The toolholder assembly of claim 11, wherein said tool retainer includes a first end for clampingly engaging a tool shank in said socket recess and a second end that contacts said outer collar.

13. The toolholder assembly of claim 12, wherein said second end of said tool retainer is mounted on said outer collar.

14. The toolholder assembly of claim 13, wherein said tool retainer freely extends through a bore in said portion of said inner collar wall.

15. The toolholder assembly of claim 14, wherein said inner collar is annular, and said tool retainer is movable along a radius of said inner collar.

16. The toolholder assembly of claim 11, wherein said socket recess is complementary in shape to said shank of said tool.

17. The toolholder assembly of claim 16, wherein said outer collar is annular, and includes an inner surface that closely circumscribes the outer periphery of the inner collar.

18. The toolholder assembly of claim 11, wherein the tool retainer is aligned with said compressive force applying means to avoid the generation of moment forces in said shank.

19. The toolholder assembly of claim 11, wherein said socket recess holds the end of a shank of a punch in a compacting press.

20. The toolholder assembly of claim 11, further comprising a punch for compacting powders in a compacting press, said punch having a shank that is received into the socket recess of said inner collar.

21. An improved toolholder for holding the shank of a punch in a compacting press in a desired alignment within a socket, comprising:

an inner collar having an annular wall with an inner surface that defines the socket recess for receiving a shank of a punch in a compacting press, and an outer surface that defines a collar periphery;

an outer clamping assembly surrounding said inner collar including a set screw for applying a compressive force on one portion of said inner collar wall while pulling a portion of said outer clamping assembly compressively against an opposing portion of said inner collar wall, and a tool retainer freely extending through a bore in said opposing portion of said inner collar wall for directing said compressive force across said socket recess to retain said shank of said punch in said socket recess while diverting said compressive force away from said opposing portion of said inner collar wall to prevent hoop distortion from occurring in said inner collar wall that could misalign said punch shank with respect to said socket recess.

* * * * *